(12) United States Patent
Skoptsov et al.

(10) Patent No.: US 9,095,835 B2
(45) Date of Patent: Aug. 4, 2015

(54) METHOD FOR PROCESSING HYDROCARBON FUELS USING MICROWAVE ENERGY

(71) Applicant: H Quest Partners, LP, Pittsburgh, PA (US)

(72) Inventors: George L. Skoptsov, Pittsburgh, PA (US); Alan A. Johnson, Calgary (CA)

(73) Assignee: H QUEST PARTNERS, LP, Pittsburgh, PA (US)

( * ) Notice: Subject to any disclaimer, the term of this patent is extended or adjusted under 35 U.S.C. 154(b) by 0 days.

(21) Appl. No.: 14/464,345

(22) Filed: Aug. 20, 2014

(65) Prior Publication Data

US 2015/0053592 A1 Feb. 26, 2015

Related U.S. Application Data

(60) Provisional application No. 61/867,916, filed on Aug. 20, 2013.

(51) Int. Cl.
*B01J 19/12* (2006.01)
*C10G 15/08* (2006.01)
(Continued)

(52) U.S. Cl.
CPC ........ *B01J 19/126* (2013.01); *C10G 1/00* (2013.01); *C10G 15/08* (2013.01); *C10G 15/12* (2013.01); *B01J 2219/1206* (2013.01)

(58) Field of Classification Search
CPC ....... B01J 19/126; C10G 1/004; C10G 1/008; C10G 1/06; C10G 1/065; C10G 9/16; C10G 15/08; C10G 32/02; C10G 2300/4075; C10B 43/02; C10B 49/04
USPC .......................................................... 422/186
See application file for complete search history.

(56) References Cited

U.S. PATENT DOCUMENTS 4,010,089 A 3/1977 Stowell et al.
4,454,022 A * 6/1984 Shoji et al. .................. 208/48 R
(Continued)

FOREIGN PATENT DOCUMENTS

CN 2821468 9/2006
EP 2606003 A1 6/2013
(Continued)

OTHER PUBLICATIONS

Strohm et al., Lowering the Cost and Environmental Impace of Direct Coal Liquefaction through Wave Liquefaction(TM) Technology, published Jun. 2, 2013.
(Continued)

*Primary Examiner* — Renee E Robinson
(74) *Attorney, Agent, or Firm* — Fox Rothschild LLP (57) ABSTRACT

A method of operating a hydrocarbon material processing system includes feeding a hydrocarbon feedstock from a hydrocarbon feedstock source into a reaction tube positioned within an opening of a waveguide, feeding a process gas from a process gas source into the reaction tube, receiving microwaves in the waveguide from a microwave generator, energy from the waveguide in the reaction tube to cause the feedstock and process gas to react and form into a product stream comprising a fuel product. The method also includes periodically delivering a cleaning gas into the reaction tube, without stopping the propagation of the energy and without pausing the feeding of the hydrocarbon feedstock and the process gas into the reaction tube.

17 Claims, 7 Drawing Sheets

(51) Int. Cl.
*C10G 15/12* (2006.01)
*C10G 1/00* (2006.01)

(56) References Cited

U.S. PATENT DOCUMENTS

| | | | |
|---|---|---|---|
| 4,487,683 | A | 12/1984 | Bozzuto |
| 5,679,215 | A | 10/1997 | Barnes et al. |
| 6,224,836 | B1 | 5/2001 | Moisan et al. |
| 6,506,584 | B1 | 1/2003 | Chandler et al. |
| 7,022,505 | B2 | 4/2006 | Chandler et al. |
| 7,581,549 | B2 | 9/2009 | Johnson et al. |
| 7,799,119 | B2 | 9/2010 | Zakrzewski et al. |
| 8,657,999 | B2 | 2/2014 | Lissianski et al. |
| 2005/0167260 | A1 | 8/2005 | Kong et al. |
| 2009/0038932 | A1 | 2/2009 | Denslow et al. |
| 2010/0307960 | A1 | 12/2010 | Lissianski et al. |
| 2010/0308036 | A1* | 12/2010 | Tomita et al. .............. 219/756 |
| 2012/0024843 | A1 | 2/2012 | Lissianski et al. |
| 2012/0082593 | A1* | 4/2012 | Stiller et al. .............. 422/187 |
| 2012/0186972 | A1 | 7/2012 | Li et al. |
| 2013/0165710 | A1 | 6/2013 | Hemmings et al. |
| 2013/0213795 | A1 | 8/2013 | Strohm et al. |

FOREIGN PATENT DOCUMENTS

| | | |
|---|---|---|
| JP | H10310777 | 11/1998 |
| RU | 2462500 | 7/2013 |
| WO | WO2011047446 | 4/2011 |
| WO | WO2011131207 | 10/2011 |

OTHER PUBLICATIONS

Moisan et al., "Multitube surface-wave discharges for increased gas throughput at atmospheric pressure", Journal of Applied Physics, vol. 83, No. 11, Jun. 1, 1998, pp. 5691-5701.

Verkerk, Arjan, "Surface-wave discharges in a XeC1 laser mixture", A search for novel microwave applications, Master Thesis, Jul. 2005.

* cited by examiner

METHOD FOR PROCESSING HYDROCARBON FUELS USING MICROWAVE ENERGY

RELATED APPLICATIONS AND CLAIM OR PRIORITY

This patent document claims priority to U.S. Provisional Patent Application No. 61/867,916, filed Aug. 20, 2013. The disclosure of the priority application is fully incorporated by reference. This patent document is also related to U.S. patent application Ser. Nos. 14/464,260 and 14/464,284, filed on the same date as this application.

BACKGROUND

Because of the world's increasing demand for petroleum products, it has been desirable to find alternative hydrocarbon feedstock for fuel. For example, it is known to convert coal to liquid fuels using a family of processes known as coal liquefaction. Such processes are disclosed in, for example, U.S. Pat. No. 4,487,683, the disclosure of which is fully incorporated herein by reference. It is also known to upgrade liquid hydrocarbon to fuel-quality products. Such processes are disclosed in, for example, U.S. Pat. No. 7,022,505, the disclosure of which is fully incorporated herein by reference.

Many current liquefaction and hydrocarbon upgrading processes are practically and/or economically unable to meet the scale required for commercial production. Although it is desirable that the processing be done on a continuous basis, the system periodically needs to be stopped, shut down, and vacuumed to remove carbon deposits within the system. Accordingly, improved systems for converting and upgrading hydrocarbon fuel products are needed.

This document describes methods and systems that are directed to the problems described above.

SUMMARY

In an embodiment, a method of operating a hydrocarbon material processing system includes feeding a hydrocarbon feedstock from a hydrocarbon feedstock source into a reaction tube positioned within an opening of a waveguide, feeding a process gas from a process gas source into the reaction tube, receiving microwaves in the waveguide from a microwave generator, propagating energy from the waveguide in the reaction tube to cause the feedstock and process gas to react and form into a product stream comprising a fuel product. The method also includes periodically delivering a cleaning gas into the reaction tube, without stopping the propagation of the energy and without pausing the feeding of the hydrocarbon feedstock and the process gas into the reaction tube.

Optionally, the method may also include forming a plasma from the cleaning gas, and maintaining the plasma for a period of time within the tube sufficient to burn off carbon residue from an inner sidewall of the reaction tube.

The method may further include vacuuming or flushing the carbon residue from the reaction tube, and resuming the feeding of the hydrocarbon feedstock and the process gas into the reaction tube after the vacuuming or flushing.

In various embodiments, the cleaning gas may include oxygen, argon, steam, and mixtures thereof. In certain other embodiments, the hydrocarbon feedstock may include coal, bitumen, oil sands, tar sands, oil shale, petroleum resids, asphaltenes, pre-asphaltenes or other vitrinite and kerogen-containing materials and fractions or derivatives thereof, in each case mixed with catalyst. The process gas source may include, for example, helium, argon, krypton, neon, xenon, methane, propane, butane, ethane, acetylene, propylene, butylene, ethylene, carbon monoxide, carbon dioxide, water vapor, hydrogen, and nitrogen.

The method may further include extracting the cleaning gas from the product stream.

In certain embodiments, the method may include synchronizing the pausing of the feeding of the hydrocarbon feedstock and the process gas into the reaction tube with a duty cycle of the microwave generator. In alternate embodiments, the method may include determining whether the reaction tube is coated with an unacceptable amount of deposits, and delivering the cleaning gas if such amount of deposits is determined to be present.

In an alternate embodiment, a system for processing hydrocarbon materials includes: a hydrocarbon feedstock source, wherein the hydrocarbon feedstock source; a process gas source; a cleaning gas source; a waveguide configured to receive microwaves from a microwave generator and propagating energy in a reaction tube. When the hydrocarbon feedstock from the feedstock source and process gas from the process gas source are fed into the reaction tube, and energy are propagated in the reaction tube, the feedstock and process gas react and form into a product stream. Additionally, the cleaning gas source is configured to periodically, without stopping the propagation of the energy and without pausing the feeding of the hydrocarbon feedstock and the process gas into the reaction tube, deliver a cleaning gas into the reaction tube.

In an alternate embodiment, a system for processing hydrocarbon materials includes: a hydrocarbon feedstock source, wherein the hydrocarbon feedstock source; a process gas source; a cleaning gas source; a coaxial transmitter configured to receive microwaves from a microwave generator and propagating energy in a reaction chamber. The coaxial transmitter further includes an antenna. When the hydrocarbon feedstock from the feedstock source and process gas from the process gas source are fed into the reaction chamber, and energy are propagated in the reaction chamber, the feedstock and process gas react and form into a product stream. Additionally, the cleaning gas source is configured to periodically, without stopping the propagation of the energy and without pausing the feeding of the hydrocarbon feedstock and the process gas into the reaction chamber, deliver a cleaning gas into the reaction chamber.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

This document describes systems for processing hydrocarbon materials, such as through liquefaction or through upgrading into a fuel-grade material or intermediate material. The processing may include altering the arrangement of carbon and hydrogen atoms and/or removal of heteroatoms such as sulphur, nitrogen, and oxygen. The examples described below will use coal as an example of the material to be processed. However, the system may be used to process various naturally occurring hydrocarbon-based materials such as fossil hydrocarbons and biomass. Examples of fossil hydrocarbons may include coal, bitumen, oil sands, tar sands, oil shale, resins, petroleum resids, asphaltenes, pre-asphaltenes and other kerogen-containing materials and fractions or derivatives thereof. The system may also be used to process hydrocarbon gases such as natural gas, methane, propane, ethylene, and other hydrocarbon compounds, and their mixtures, which are normally in a gaseous state of matter at room temperature and atmospheric pressure. The system also may be used to process other hydrocarbon-based materials such as municipal waste, sludge, or other carbon-rich materials.

Figure 1:
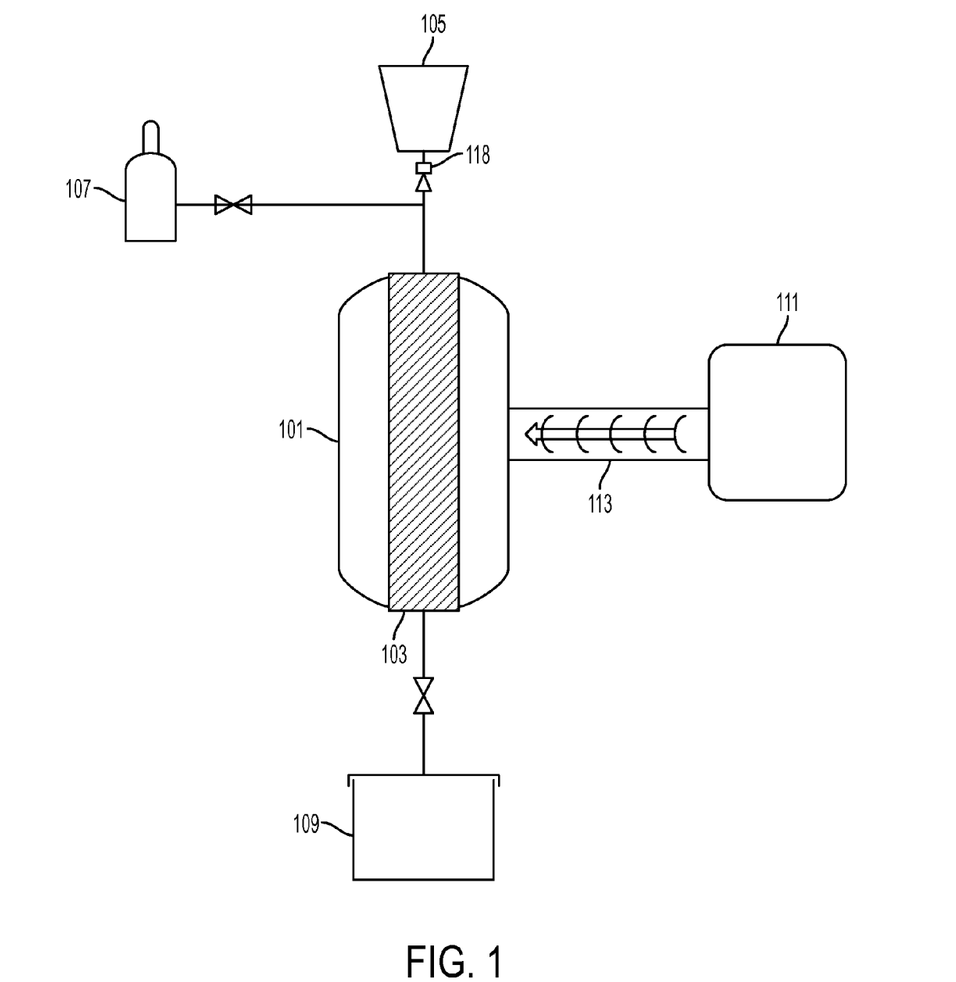
FIG. 1 is a flow schematic of a system for processing hydrocarbons.

FIG. 1 illustrates an example of a system for processing coal or other hydrocarbons. A reaction chamber 101 may be used to convert the feedstock into a liquid fuel, or upgrade the feedstock to a fuel product or intermediate product. The reaction chamber may receive feedstock from one or more hydrocarbon feedstock sources 105, such as a coal hopper. The feedstock may be in powder form (such as coal particles), optionally entrained in a gas (e.g., a mixture of natural gas, hydrogen or argon). In certain embodiments, the feedstock may be in vapor phase, when process gas temperature is higher than the boiling point of the feedstock or feedstock fractions and compounds. It may also be in liquid form as an atomized spray, droplets, emulsions, or aerosols entrained in a process gas. The hydrocarbon feedstock may be supplemented with any suitable catalyst or supplemental material, such as various metals, metal oxide salts or powders, carbon material, or other metallic materials or organometallic species which may enhance the reaction caused by microwave radiation as described below. Examples of catalysts may include materials containing iron, nickel, cobalt, molybdenum, carbon, copper, silica, oxygen, or other materials or combinations of any of these materials. The feedstock may be delivered via any suitable means, such as in powdered form and forced into the system by an injection device 118.

A flow of process gas from a process gas source 107 may be injected or otherwise delivered to the hydrocarbon feedstock before, after, or as it enters the reaction chamber 101. The process gas will react with the feedstock in the reaction chamber to yield the final product. The process gas may include, for example, hydrogen, methane or other compounds of hydrogen and carbon. Multiple process gas sources 107 may be available so that a combination of process gases is directed into the reaction chamber. An example process gas combination includes an inert gas such as argon, helium, krypton, neon or xenon. The process gas also may include carbon monoxide (CO), carbon dioxide ($CO_2$), water vapor ($H_2O$), methane ($CH_4$), hydrocarbon gases ($C_nH_{2n+2}$, $C_nH_n$, $C_nH_n$, where n=2 through 6), and hydrogen ($H_2$) gases.

The system includes a microwave generator 111, along with a waveguide 113 that directs radiation from the generator 111 into the chamber 101. The reaction chamber may include a reaction tube 103 made of quartz, borosilicate glass, alumina, sapphire, or another suitable dielectric material that enhances reaction of materials within the tube when microwave radiation is directed into the chamber 101. In some embodiments, the reaction tube 103 is made of similar conductive material as chamber 101 and may form the inner wall of the chamber 101. When provided at a suitable intensity and time duration, the microwave radiation forms a standing wave and resonates within the chamber 101, and causes a plasma to form within the reaction tube 103. The reaction may include processes such as chemical vapor deposition, gasification, thermal pyrolysis, radical reaction chemistry, ion reactions, microwave-enhanced reactions, and/or ion sputtering. The result of the reaction may be a product stream comprising a plurality of products characterized by different chemical and/or physical properties than the original reactant, as a result of rearrangement of atoms within the molecules, change in number of atoms per molecule, or number of molecules present, that may be delivered to one or more product storage vessels 109.

In certain embodiments, the reaction tube 103 may not be present, and the waveguide 113 may be connected to the chamber 101 via an entry port (not shown here). In certain other embodiments, the entry port may include a window to prevent the plasma and other chamber gases from entering the waveguide. The window may be made of quartz, borosilicate glass, alumina, sapphire, or another suitable dielectric material.

The reaction may occur at relatively low bulk process temperatures and pressures. For example, conversion and upgrading may occur with average reaction chamber pressures between 0.1 and 10 atmospheres, temperatures between −182° C. and 200° C. (the average reaction chamber temperature) and between 200° C. and 1600° C. (localized plasma temperature), and residence times between 0.001 and 600 seconds. Other parameters are possible.

Figure 2:
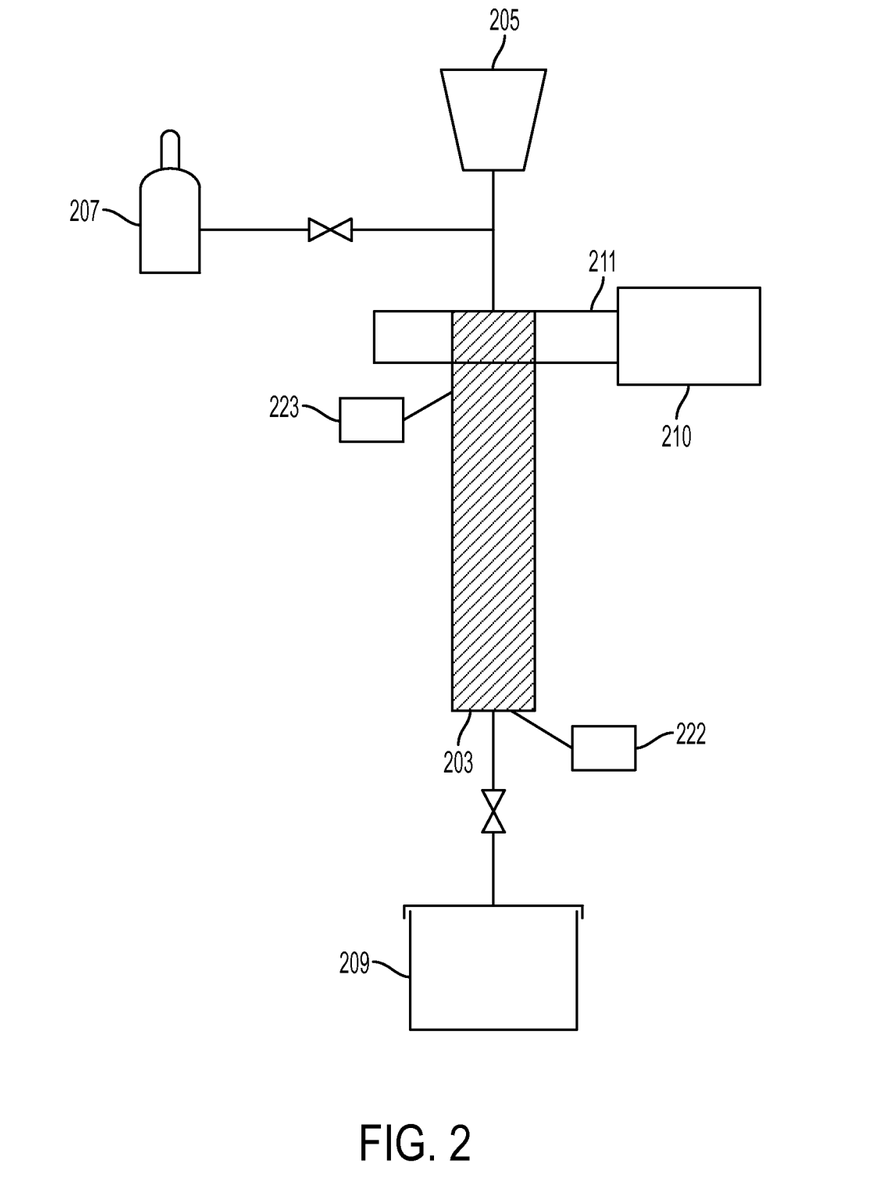
FIG. 2 is a flow schematic of an alternate system for processing hydrocarbons.

Any of the features described above may be incorporated into an alternate embodiment uses a waveguide with the reaction tube. Examples of a waveguide may include a waveguide surfatron, a surfatron, or a surfaguide. With such a system, the microwaves are launched by a wave launcher having a circular gap. As shown in FIG. 2, the surfaguide may include a waveguide 211 for receiving and launching microwave energy from a microwave generator 210 into the reaction tube 203 of the reaction chamber as feedstock and catalysts from feed sources 205, 207 are received into the reaction tube 203. As shown, the waveguide 211 includes an elongated cavity having an axis (length) that extends away from the microwave generator 210. The reaction tube 203 is received into an opening of the waveguide 211 and extends from and optionally through the waveguide 211 in a direction that is perpendicular to the length axis of the waveguide 211. Here, the feedstock supply 207, 205 passes through the waveguide 211 as or shortly after the feedstock is received into the reaction tube 203. There may be microwave discharge (plasma) within the within the reaction tube 203 induced by the microwave energy entering it. Microwave energy may also may induce electric discharges in ionized gas that rapidly and locally heat surrounding gas and hydrocarbon feedstocks, thus converting or upgrading the feedstock for delivery into a product storage facility 209. The waveguide 211 may include a capacitive couple that permits tuning the frequency of energy received within it, and the operation frequency of the surface wave sustained discharge may be up to 10 GHz. Other configurations of the waveguide/surfaguide are possible, so long as the system includes at least one wave guide and at least one reaction tube.

Figure 3:
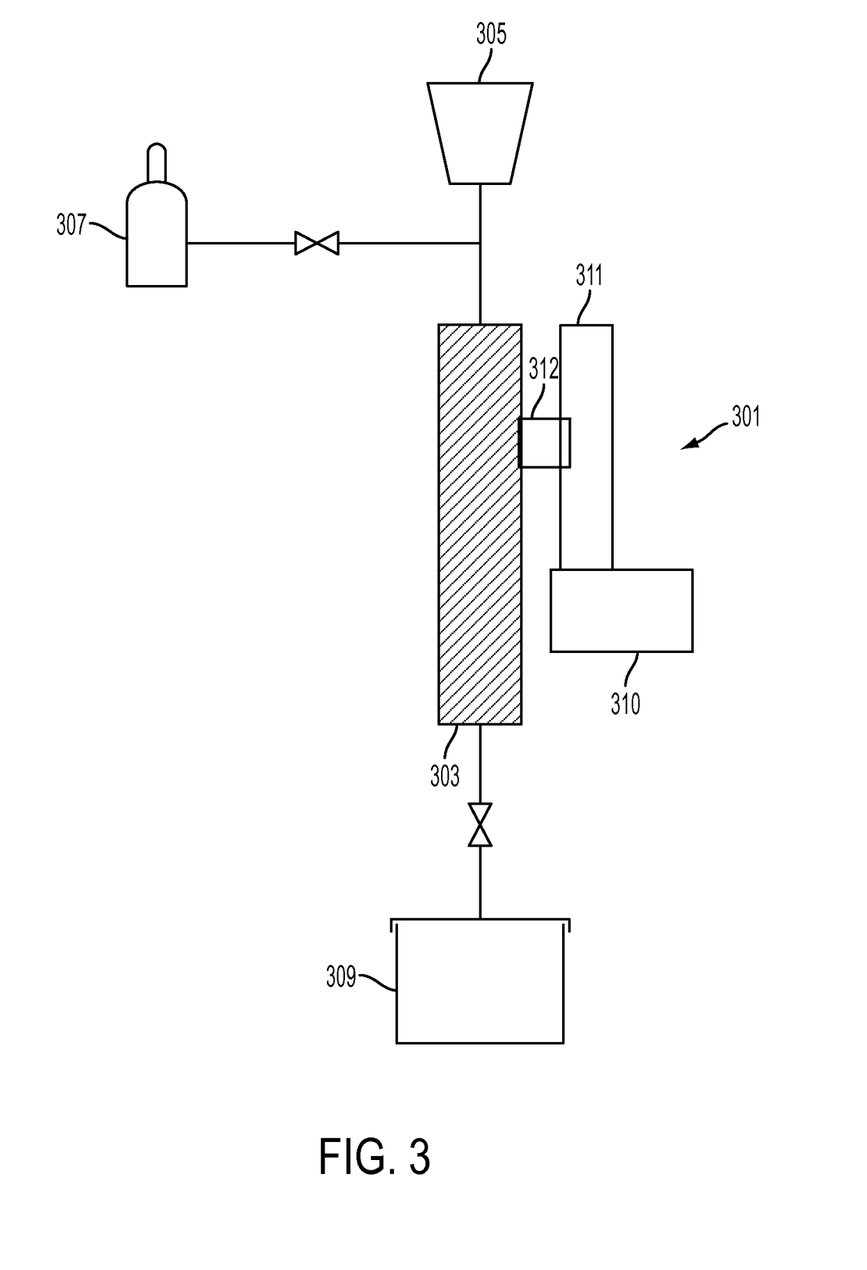
FIG. 3 is a flow schematic of an alternate system for processing hydrocarbons.

For example, FIG. 3 illustrates an alternate embodiment of a surfatron 301 with an integrated wave launcher of a coaxial type with a circular gap for forming a field configuration, and for receiving and launching microwave energy from a microwave generator 310 into the reaction tube 303 as feedstock and catalysts from feed sources 305, 307 are received into the reaction tube 303. As shown, the surfatron 301 is coaxial in that it includes a first waveguide 311 having an elongated cavity with an axis (length) that extends away from the microwave generator 310. The length axis of the first waveguide 311 is perpendicular to the longest axis of the reaction tube 303. A second waveguide 312 has a first end that connected to the first waveguide 311, a second end that is connected to the reaction tube 303, and a position so that the second waveguide's longest axis is to perpendicular the longest axis of the first waveguide 311 and that of the reaction tube 303. Here, "connected to" may include a physical connection, or a structure in which one element is received into an opening of the other element. Here, the feedstock supplies 307, 305 do not pass through the surfatron but instead enter the reaction tube 303 at another location. The energy may cause the formation of a plasma or other generation of electrical or microwave discharges within the reaction tube 303, thus converting or upgrading the feedstock for delivery into a product storage facility 309. Process gas also may be activated or ionized in the reaction tube by electric discharges, further promoting product conversion. The surfatron may include a capacitive couple for tuning the operation frequency, and the operation frequency may be between 100 MHz –2.4 GHz.

Figure 4:
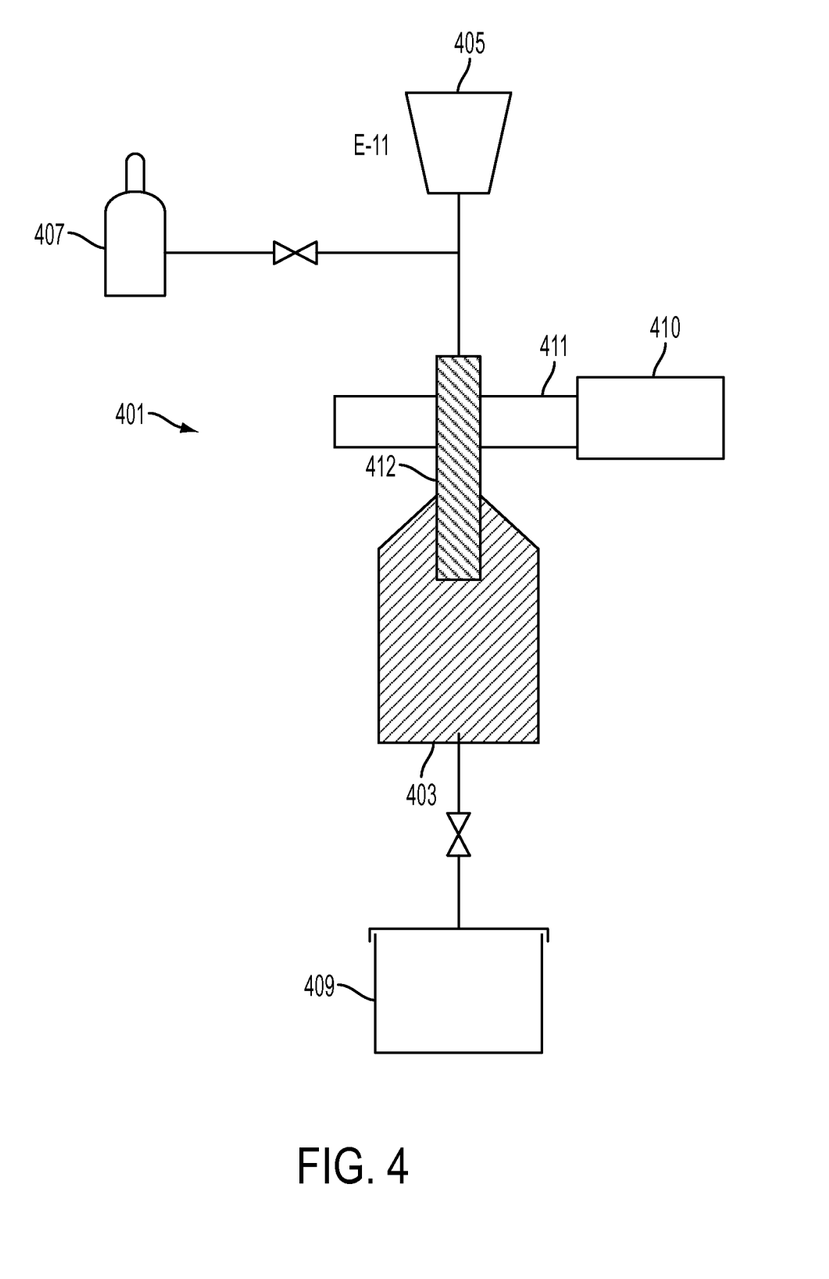
FIG. 4 is a flow schematic of an alternate system for processing hydrocarbons.

FIG. 4 illustrates an alternate embodiment of a waveguide surfatron 401 in which an integrated wave launcher uses both waveguide 411 and coaxial 412 components to launch microwave energy from a microwave generator 410 into the reaction chamber 403 as feedstock and catalysts from feed sources 405, 407 are received into the chamber 403. The waveguide includes a lateral waveguide component 411 that receives microwaves from the microwave generator 410 and a coaxial waveguide component 412 that intersects the lateral component 411 in a perpendicular orientation, and directs the microwaves into the reaction tube 403. The longest dimension of the reaction tube 403 is parallel to that of the coaxial waveguide component 412 and perpendicular to that of the lateral waveguide component 411.

Optionally, the reaction tube may be the coaxial waveguide component 412 along with a larger chamber 403. If so, the coaxial waveguide component may be considered a reaction tube in which a portion of the plasma begins to form.

The tube or chamber 403 is connected to a first end of the coaxial waveguide component 412, and a second end of the coaxial waveguide component 412 is connected to the lateral waveguide component 411. Here, "connected to" again may include a physical connection, or a structure in which one element is received into an opening of the other element. The energy may cause the formation of a plasma or other generation of electrical or magnetic discharges within the reaction tube 403, along with activation or ionization of process gas, thus converting or upgrading the feedstock for delivery into a product storage facility 409. As shown, the tube/chamber 403 has a wider portion and a tapered portion, so that the tapered portion is connected to the coaxial waveguide component 412. The waveguide surfatron may include good tuning capabilities of a surfatron and the high power capabilities of a sufaguide, and may be included in a large scale reaction chamber.

Figure 5:
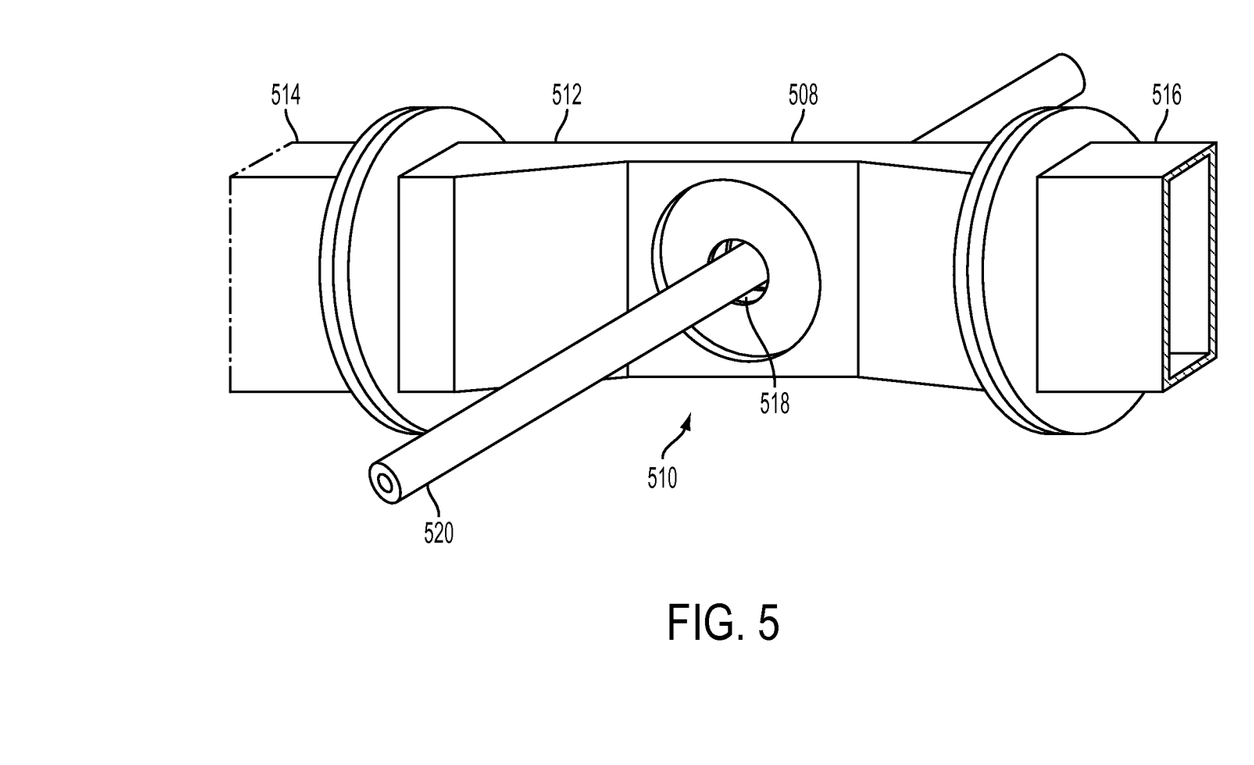
FIG. 5 is an illustration of an example of a surfaguide that may be used with the disclosed system.

FIG. 5 illustrates an example of a surfaguide 510 that may be used in connection with the embodiments described above. The surfaguide 510 includes a housing 512 made of an electrically conductive material. Examples of an electrically conductive material may include copper, zinc, aluminum, and brass. One end 514 of the housing is configured to be connected to the output of a microwave generator, while the opposite end 516 is closed to contain the generated waves. As shown, the housing includes a central portion 508 with a depth dimension that is smaller than the depth dimension (front face to rear face based on the orientation shown in FIG. 5) of the ends 514, 516. The central portion 508 includes a slot 518 through which the reaction tube 520 passes. The slot 518 may be circular. The reaction tube 520 is positioned so that its length is substantially perpendicular to the depth dimension of the housing 512. Examples of such a surfaguide 510 are described in more detail in U.S. Pat. Nos. 6,224,836, and 7,799,119 the disclosures of which are fully incorporated herein by reference. In operation, the housing 512 concentrates the radiation that is recovered from the microwave generator, via an opening at end 514, onto the tube 520 so as to propagate an electromagnetic surface wave within the tube 520. When the surface wave interacts with the feedstock and other reaction materials, it causes the generation of a plasma within the tube. In certain embodiments, the length of the plasma created by the surfaguide may be longer.

Figure 6:
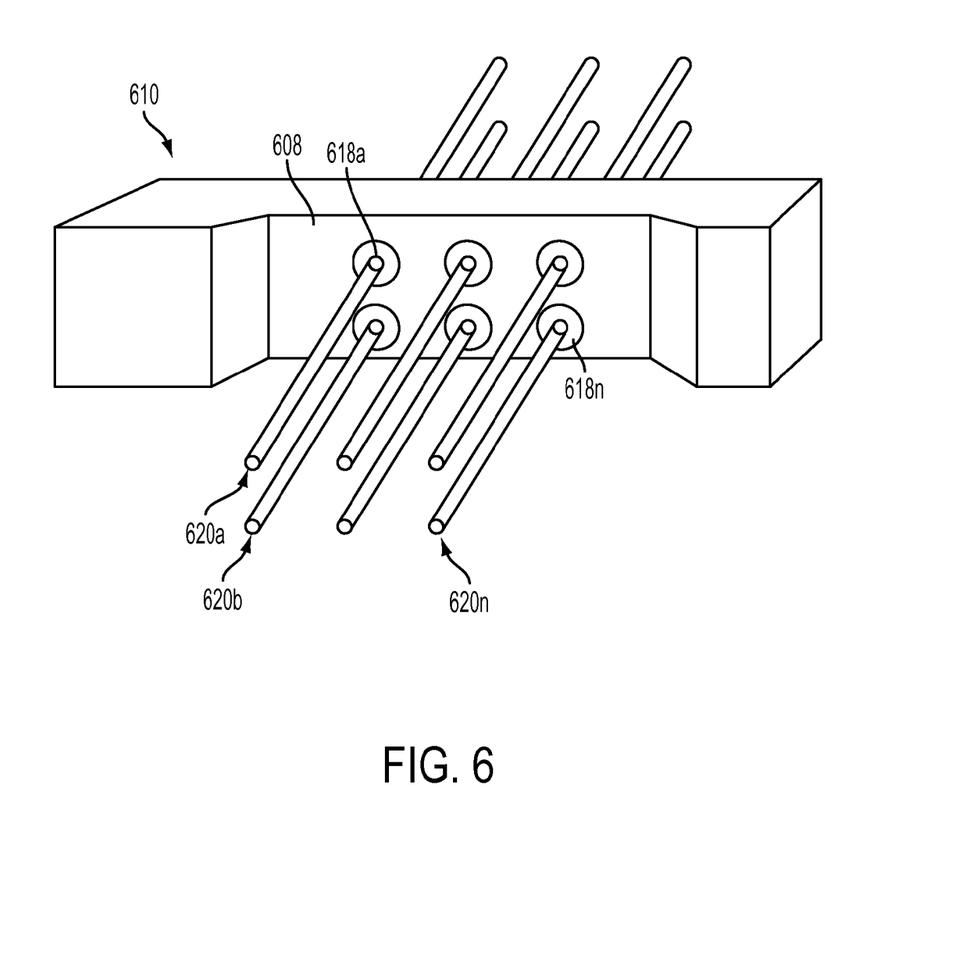
FIG. 6 is an illustration of an alternate example of a surfaguide that may be used with the disclosed system.

FIG. 6 illustrates an alternate embodiment where processing capacity of the system may be increased by including a surfaguide 610 whose central portion 608 includes multiple circular gaps 618a . . . 618n, each of which is configured to receive a reaction tube 620a . . . 620n. In this way, material may be processed in multiple tubes at multiple times. Alternatively, the various tubes may have varying diameters or may be made of varying materials to allow for selectable variations in frequencies or other characteristics of the standing waves propagated within the tubes, to allow for selective processing of different materials within a single system.

Figure 7:
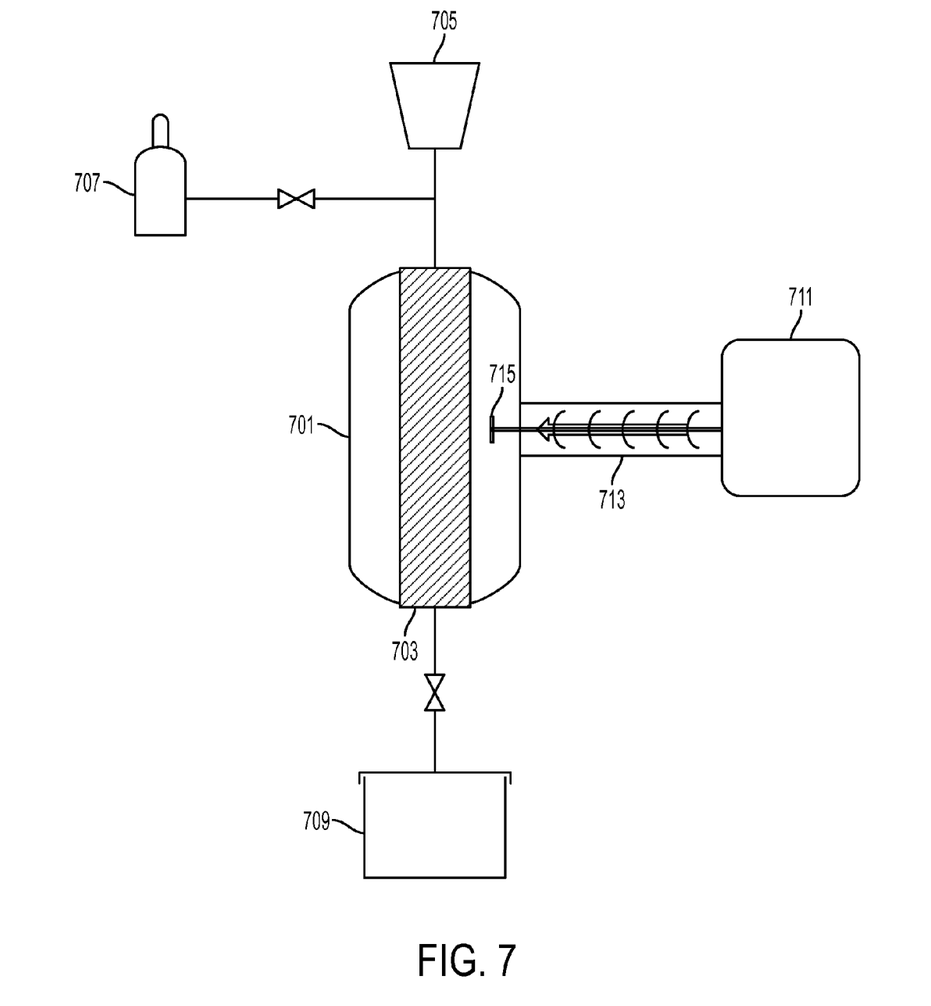
FIG. 7 is a flow schematic of an alternate system for processing hydrocarbons.

FIG. 7 illustrates an alternate embodiment for processing hydrocarbons where the radiation from the generator 711 is received, and launched into the reaction tube 703 via a coaxial transmitter 713. The coaxial transmitter may include an inner conductor surrounded by a tubular insulating layer (and a dielectric), surrounded by a tubular conducting shield, for propagating the radiation received from the generator 111. As shown, the coaxial transmitted 713 includes an elongated cavity having an axis (length) that extends away from the microwave generator 711. The coaxial transmitter may also include an antenna 715 extending into the chamber 701 for launching the radiation into the chamber 701 as feedstock and catalysts from feed sources 705, 707 are received into the reaction tube 703. The radiation energy may cause the formation of a plasma or other generation of electrical or microwave discharges within the reaction tube 703, thus converting or upgrading the feedstock for delivery into a product storage facility 709.

Example energy frequencies that may be applied from the microwave generator(s) may include those in the range of 10 Hz-10 GHz, or any frequencies that may promote ionization of process gas. Example processing times may be less than a second (on order of 100 ms), but can have a 0.001-600 second range, as well as other ranges. The frequency and intensity of the energy, the specific composition of the process gases introduced and the processing time may be sufficient to process the feedstock into a final product, such as synthetic crude oil with hydrocarbon fraction having at least one of the following properties: low molecular weight, low boiling point, and low percentage of aromatics. When energy is applied in the reaction chamber, process gas passing through the reaction chamber is ionized and activated as result of the microwave or electric discharge. Process gas may also be heated.

The particles of coal or other hydrocarbon material are contacted by with discharges and heated as they pass through the reactor while in contact with the microwave or electric discharge. The coal or other hydrocarbon may additionally be heated through dielectric heating, as its structure may change after a certain temperature and its conductive and dielectric properties may change. In particular, when the hydrocarbon material is rapidly heated, the following may occur: (1) volatile compounds and/or moisture present in the particles are rapidly vaporized and may cause rapid (explosive) disintegration of the particles; (2) these vaporized compounds, which may vary in molecular weight, may react with radicals and ions in the activated, excited and/or ionized process gas; (3) large hydrocarbon molecule(s) (macromolecules) start breaking apart, and the broken-off compounds varying in molecular weight are vaporized and capped by hydrogen and methyl radicals (by-products of process gas ionization; and (4) some macromolecules may not be broken up or only partially broken up, resulting in partially reacted or unreacted hydrocarbon particles. In some embodiments, bulk temperatures (gas stream temperatures) on the exit from reactor generally do not exceed 200-300° C., although other and higher temperatures are possible.

During operation, to maximize production, it may be desirable to provide the flow of feedstock and process gas on a continuous basis. However, because of the nature of the reaction (which includes chemical vapor deposition), carbon and other process materials may become deposited on the inner walls of the reaction tube structure. This may form a film that may absorb microwave radiation, reducing its intensity inside the reaction tube and altering the microwave field distribution, and disrupting the standing wave necessary to sustain plasma and the reactions within. Accordingly, the system may need to be periodically taken offline for maintenance so that deposited materials may be vacuumed, flushed within an inert gas or process gas, scrubbed or otherwise cleaned from the sidewalls of the tube.

To avoid or reduce the need for such process interruptions, in one method of operating any of the systems described above, the hydrocarbon source and some or all of the process gas sources may be turned off or closed off (such as by the closing of one or more valves), and instead a flow of a cleaning gas such as oxygen or oxygen-containing gas mixture may be run through the system. When the microwave energy interacts with the oxygen or oxygen-containing gas in the tube, a plasma forms that will burn the film from the tube. Other gases such as argon or other inert gases, may be mixed with the oxygen to enhance plasma generation. The plasma may be maintained in the reaction tube for a period of time that is sufficient to burn off at least a part of carbon residue film from the reaction tube sidewalls. When the burn-off process is complete, the oxygen source may be closed and the process gas and hydrocarbon feedstock sources may be re-opened. The burn-off process may involve the following reactions:

$$2CO+O_2 \rightleftarrows 2CO_2$$

$$C+O_2 \rightleftarrows CO_2$$

Optionally, referring to FIG. 2 (although this option may be included in any embodiment), the system may include a vacuum unit 222 positioned at the outlet of the reaction tube to pull any burned-off residue from the chamber via a suction force. In this way, the films may be removed without the need to take the unit offline for maintenance so as to ensure minimum disruption to operation. In certain other embodiments, the system may include a flushing unit 223 at the inlet or outlet of the reaction tube to remove any burned-off residue from the chamber via flushing.

In certain embodiments, the cleaning gas containing oxygen may be extracted from the main product stream, and recycled into the system during the cleaning cycle. This may occur via an extraction unit such as a vacuum (as described above at 222), filter or other device.

In an embodiment, the carbon deposits in the system may react with oxygen in the presence of plasma to form a cleaning product stream which may include CO, $CO_2$ and $H_2$. In certain embodiments, all or a part of the cleaning may be directed towards and mixed with the product gas stream, and may be processed downstream with other products. In an embodiment, the ratio of CO to $CO_2$ may depend on the concentration of oxygen in the input cleaning gas.

Alternatively and/or additionally, the cleaning gas may include steam or steam-containing gas mixture to remove the carbon deposits through steam reforming. Carbon in the presence of plasma may react with water in the steam to form a cleaning product stream, which may include $CO_2$ and $H_2$. In certain embodiments, the cleaning gas containing steam may be extracted from the main product stream by an extraction unit such as a vacuum, filter or other device, and recycled into the system during the cleaning cycle. The reforming process may involve the following reactions:

$$CO+H_2O \rightleftarrows CO_2+H_2$$

$$C+2H_2O \rightleftarrows CO_2+2H_2$$

In an alternate embodiment, the system may include a controller that controls various functions of the system. For example, the controller may regulate the delivery of the cleaning gas, instead of feedstock, into the chamber on a time cycle that corresponds to a duty cycle of the microwave generator. Thus, based on the generator's cycle, the controller may cause the system to alternate between running cleaning gas through the system and running feedstock through the system. The automation of this cycle may be implemented by a controller that includes a processor and computer-readable memory having programming instructions that, when executed, instruct the processor to generate and transmit appropriate signals to open and close system valves, or otherwise start and stop various sources, to implement the processes described above. Other options include a system on a chip, a programmed device such as a field programmable gate array, or other device that is configured to receive one or more parameters and generate one or more commands to various components of the system.

In an alternate embodiment, the delivery of the cleaning gas, instead of feedstock, into the chamber may be timed to correspond to making a determination whether the reaction tube is coated with an unacceptable amount of carbon deposits. The unacceptable amount of carbon deposits may be determined based on a predetermined decrease in the quantity or quality of the fuel products.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for processing hydrocarbon materials, comprising:
   a hydrocarbon feedstock source;
   a process gas source;
   a waveguide configured to receive microwaves from a microwave generator and propagate microwave energy in a reaction tube;
   a reaction tube, wherein when hydrocarbon feedstock from the feedstock source and process gas from the process gas source are fed into the reaction tube and microwave energy from the waveguide is propagated in the reaction tube, a first plasma is formed within the reaction tube and the first plasma causes the feedstock and process gas to react and form into a product stream;
   a cleaning gas source configured to periodically, without stopping the propagation of the microwave energy from the waveguide into the reaction tube, deliver a cleaning gas comprising oxygen into the reaction tube and form a second plasma from the cleaning gas in the presence of the microwave energy so that the second plasma causes burning off of a carbon residue film from the reaction tube; and
   an extraction unit configured to extract the cleaning gas from the product stream and deliver the extracted cleaning gas to the cleaning gas source.

2. The system of claim 1, further configured to:
   pause the feeding of the hydrocarbon feedstock and the process gas in the reaction tube upon delivery of the cleaning gas; and
   maintain the second plasma for a period of time within the reaction tube sufficient to burn off at least a portion of the carbon residue film from an inner sidewall of the reaction tube.

3. The system of claim 2, further configured to:
   vacuum or flush the burned-off carbon residue film from the reaction tube; and
   after the vacuuming or flushing, resume the feeding of the hydrocarbon feedstock and the process gas into the reaction tube.

4. The system of claim 2, further comprising a controller that is configured to synchronize the pausing of the feeding of the hydrocarbon feedstock and the process gas into the reaction tube with a duty cycle of the microwave generator.

5. The system of claim 2, further comprising a controller configured to determine whether the reaction tube is coated with an unacceptable amount of deposits, and pause the feeding of the hydrocarbon feedstock and the process gas into the reaction tube and delivering the cleaning gas into the reaction tube if such amount of deposits is determined to be present.

6. The system of claim 1, wherein:
   the hydrocarbon feedstock comprises coal mixed with catalyst; and
   process gas source comprises one or more sources of gases selected from the group consisting of helium, argon, krypton, neon, xenon, methane, propane, butane, ethane, acetylene, propylene, butylene, ethylene, carbon monoxide, carbon dioxide, water vapor, hydrogen, and nitrogen.

7. The system of claim 1, wherein the cleaning gas further comprises at least one of the following: argon, steam, or mixtures thereof.

8. A system for processing hydrocarbon materials, comprising:
   a hydrocarbon feedstock source;
   a process gas source;
   a coaxial transmitter configured to receive microwaves from a microwave generator and propagate microwave energy in a reaction chamber, wherein the coaxial transmitter further comprises an antenna; and
   a reaction chamber, wherein when hydrocarbon feedstock from the feedstock source and process gas from the process gas source are fed into the reaction chamber and microwave energy from the coaxial transmitter is propagated in the reaction chamber, a first plasma is formed within the reaction tube and the first plasma causes the feedstock and process gas to react and form into a product stream;
   a cleaning gas source configured to periodically, without stopping the propagation of the microwave energy from the coaxial transmitter into the reaction chamber, deliver a cleaning gas comprising oxygen into the reaction chamber and form a second plasma from the cleaning gas in the presence of the microwave energy so that the second plasma causes burning off of a carbon residue film from the reaction tube; and
   an extraction unit configured to extract the cleaning gas from the product stream and deliver the extracted cleaning gas to the cleaning gas source.

9. The system of claim 8, further configured to:
   pause the feeding of the hydrocarbon feedstock and the process gas in the reaction tube upon delivery of the cleaning gas; and
   maintain the second plasma for a period of time within the reaction chamber sufficient to burn off at least a portion of the carbon residue film from an inner sidewall of the reaction chamber.

10. The system of claim 9, further configured to:
    vacuum or flush the burned-off carbon residue film from the reaction chamber; and
    after the vacuuming or flushing, resume the feeding of the hydrocarbon feedstock and the process gas into the reaction chamber.

11. A method of processing hydrocarbon materials using the hydrocarbon material processing system according to claim 1, comprising:
    feeding a hydrocarbon feedstock from a hydrocarbon feedstock source into a reaction tube positioned within an opening of a waveguide;
    feeding a process gas from a process gas source into the reaction tube;
    receiving microwaves in the waveguide from a microwave generator;
    propagating microwave energy from the waveguide into the reaction tube to cause the formation of a first plasma in the reaction tube, wherein the first plasma causes the feedstock and process gas to react and form into a product stream comprising a fuel product; and
    periodically, without stopping the propagation of the microwave energy into the reaction tube, delivering a cleaning gas comprising oxygen, from a cleaning gas source, into the reaction tube;
    forming a second plasma in the reaction tube, from the cleaning gas in the presence of the microwave energy, so that the second plasma causes burning off of a carbon residue film from the reaction tube;
    extracting the cleaning gas from the product stream; and
    delivering the extracted cleaning gas to the cleaning gas source.

12. The method of claim 11, further comprising:
pausing the feeding of the hydrocarbon feedstock and the process gas in the reaction tube upon delivery of the cleaning gas; and
maintaining the second plasma for a predetermined period of time within the reaction tube sufficient to burn off at least a portion of the carbon residue film from an inner sidewall of the reaction tube.

13. The method of claim 12, further comprising:
vacuuming or flushing the burned-off carbon residue film from the reaction tube; and
after the vacuuming or flushing, resuming the feeding of the hydrocarbon feedstock and the process gas into the reaction tube.

14. The method of claim 12, further comprising synchronizing the pausing of the feeding of the hydrocarbon feedstock and the process gas into the reaction tube with a duty cycle of the microwave generator.

15. The method of claim 12 further comprising determining whether the reaction tube is coated with an unacceptable amount of deposits, and delivering the cleaning gas if such amount of deposits is determined to be present.

16. The method of claim 11, wherein:
the hydrocarbon feedstock comprises coal mixed with catalyst; and
process gas source comprises one or more sources of gases selected from the group consisting of helium, argon, krypton, neon, xenon, methane, propane, butane, ethane, acetylene, propylene, butylene, ethylene, carbon monoxide, carbon dioxide, water vapor, hydrogen, and nitrogen.

17. The method of claim 11, wherein the cleaning gas further comprises at least one of the following: argon, steam, or mixtures thereof.

* * * * *